US011604889B2

(12) United States Patent
Illendula et al.

(10) Patent No.: US 11,604,889 B2
(45) Date of Patent: Mar. 14, 2023

(54) EFFICIENT AND SECURE SHARING OF LARGE DATA REPOSITORIES

(71) Applicant: Intel Corporation, Santa Clara, CA (US)

(72) Inventors: Ajith K. Illendula, Albuquerque, NM (US); Kshitij A. Doshi, Chandler, AZ (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 15/777,721

(22) PCT Filed: Dec. 22, 2015

(86) PCT No.: PCT/US2015/067535
§ 371 (c)(1),
(2) Date: May 21, 2018

(87) PCT Pub. No.: WO2017/111973
PCT Pub. Date: Jun. 29, 2017

(65) Prior Publication Data
US 2018/0349631 A1    Dec. 6, 2018

(51) Int. Cl.
*H04L 29/06* (2006.01)
*G06F 21/62* (2013.01)
*G06F 16/27* (2019.01)
*G06F 16/23* (2019.01)
*G06F 16/11* (2019.01)
*H04L 9/40* (2022.01)

(52) U.S. Cl.
CPC ........ *G06F 21/6227* (2013.01); *G06F 16/116* (2019.01); *G06F 16/2365* (2019.01); *G06F 16/278* (2019.01); *H04L 63/10* (2013.01)

(58) Field of Classification Search
CPC ......... G06F 21/62; G06F 16/116; H04L 63/10
See application file for complete search history.

(56) References Cited

U.S. PATENT DOCUMENTS 8,793,343 B1 * 7/2014 Sorenson, III ...... G06F 11/2025
709/219
9,210,178 B1   12/2015 Roth et al.
9,251,090 B1 *  2/2016 Borthakur ............... G06F 12/08
(Continued)

OTHER PUBLICATIONS

"Secure Logical Isolation for Multi-Tenancy in Cloud Storage" by Michael Factor (Year: 2013).*
(Continued)

*Primary Examiner* — Wasika Nipa
(74) *Attorney, Agent, or Firm* — Jordan IP Law, LLC

(57) ABSTRACT

Systems, apparatuses and methods may provide for a memory apparatus that includes a client-side address space dedicated to an accessor of obfuscated multi-tenant data, wherein an executable view generation library is stored to the client-side address space. In one example, the executable view generation library is to receive a request to access at least a portion of the obfuscated multi-tenant data, convert the obfuscated multi-tenant data to deobfuscated multi-tenant data based on metadata associated with the executable view generation library and generate a single-tenant view based on the deobfuscated multi-tenant data.

12 Claims, 6 Drawing Sheets

(56) References Cited

U.S. PATENT DOCUMENTS

| | | | |
|---|---|---|---|
| 9,946,895 B1* | 4/2018 | Kruse | G06F 21/6227 |
| 10,452,529 B1* | 10/2019 | Davis | G06F 9/5072 |
| 2011/0029398 A1* | 2/2011 | Boudville | G06Q 30/0601 |
| | | | 705/26.1 |
| 2013/0097713 A1* | 4/2013 | White | G06F 21/56 |
| | | | 726/26 |
| 2013/0204849 A1 | 8/2013 | Chacko | |
| 2013/0346748 A1 | 12/2013 | Orsini et al. | |
| 2014/0013398 A1 | 1/2014 | Hotti | |
| 2015/0007263 A1* | 1/2015 | Stewart | H04L 63/0815 |
| | | | 726/3 |

OTHER PUBLICATIONS

International Preliminary Report on Patentability for International Patent Application No. PCT/US2015/067535, dated Jul. 5, 2018, 11 pages.

Chong et al., "Multi-tenant data architecture", msdn.microsoft.com/en-us/library/aa479086(d=printer).aspx, Jun. 2006, 18 pages.

"Intel Digital Random Number Generator (DRNG)", Software Implementation Guide, Rev. 1.1, Aug. 7, 2012, 35 pages.

"IOS Security: iOS 9.0 or later", iOS Security-White Paper, Sep. 2015, 60 pages.

Ocheltree, Randy, "Deploying applications on a windows embedded compact OS with security loader", Dec. 2011, 8 pages.

Ramakesavan et al., "Intel Memory Protection Extensions (Intel MPX) Enabling Guide", Apr. 2015, 38 pages.

"A primer on Intel Software Guard Extensions (Intel SGX)", 1 page.

Gulley et al., "Intel SHA extensions: New instructions supporting the secure hash algorithm on Intel architecture processors", Jul. 2013, 22 pages.

Greene, J., "Intel trusted execution technology", 2010-2012, 8 pages.

Wikipedia, "Data masking", en.wikipedia.org/wiki/Data_masking, retrieved on Oct. 18, 2015, 7 pages.

Wikipedia, "Opaque data type", en.wikipedia.org/wiki/Opaque_data_type, retrieved on Oct. 18, 2015, 2 pages.

International Search Report and Written Opinion for International Patent Application No. PCT/US2015/067535, dated Aug. 24, 2016, 14 pages.

* cited by examiner

FIG. 2
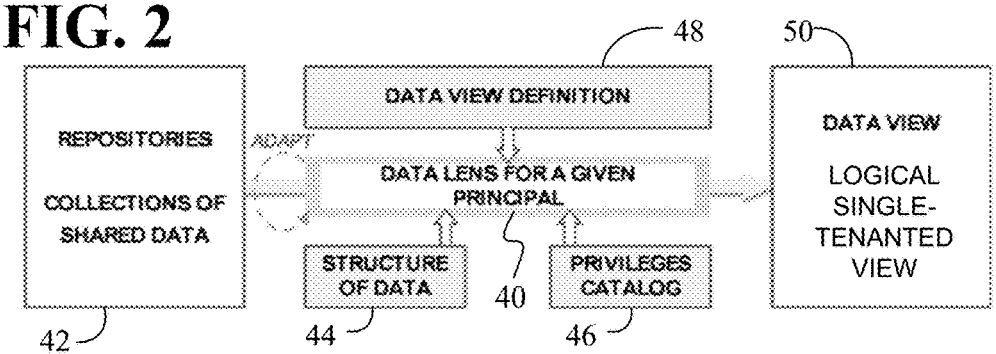
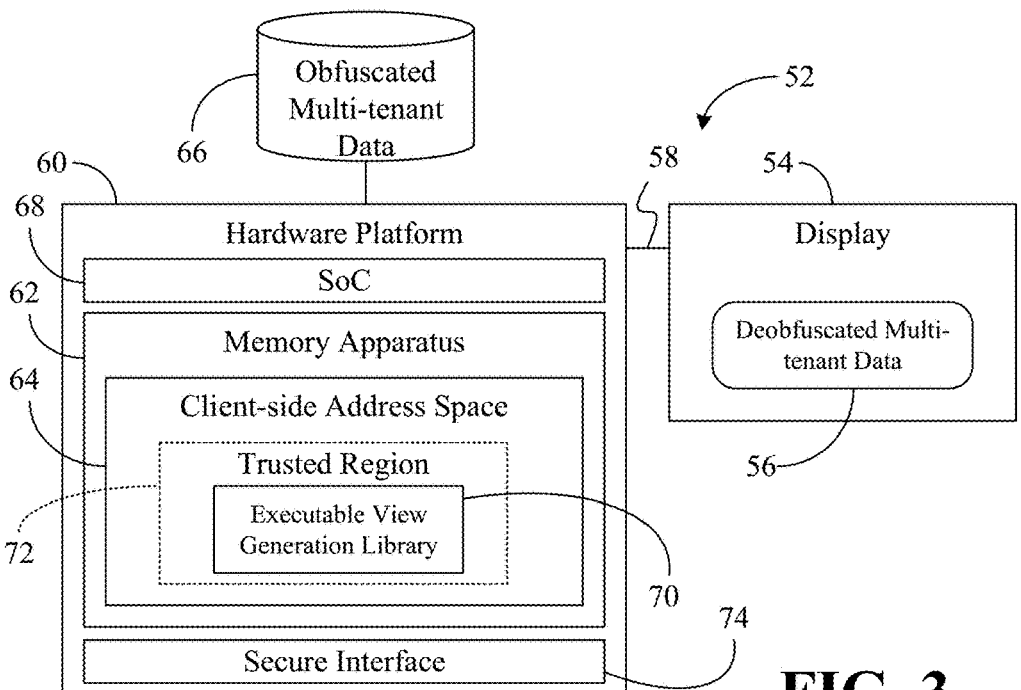
FIG. 3
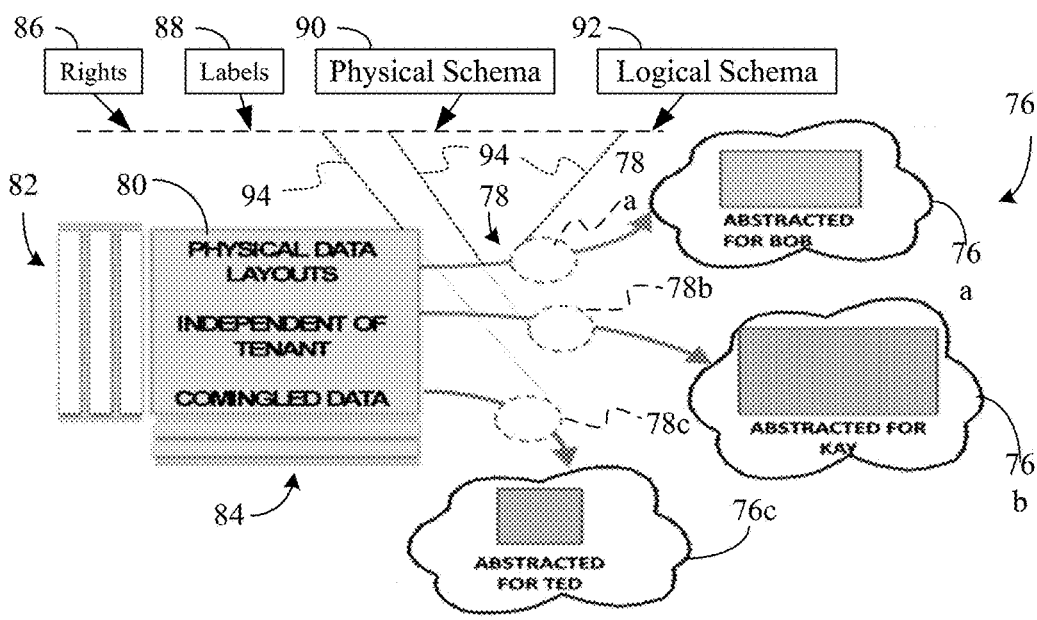
FIG. 4

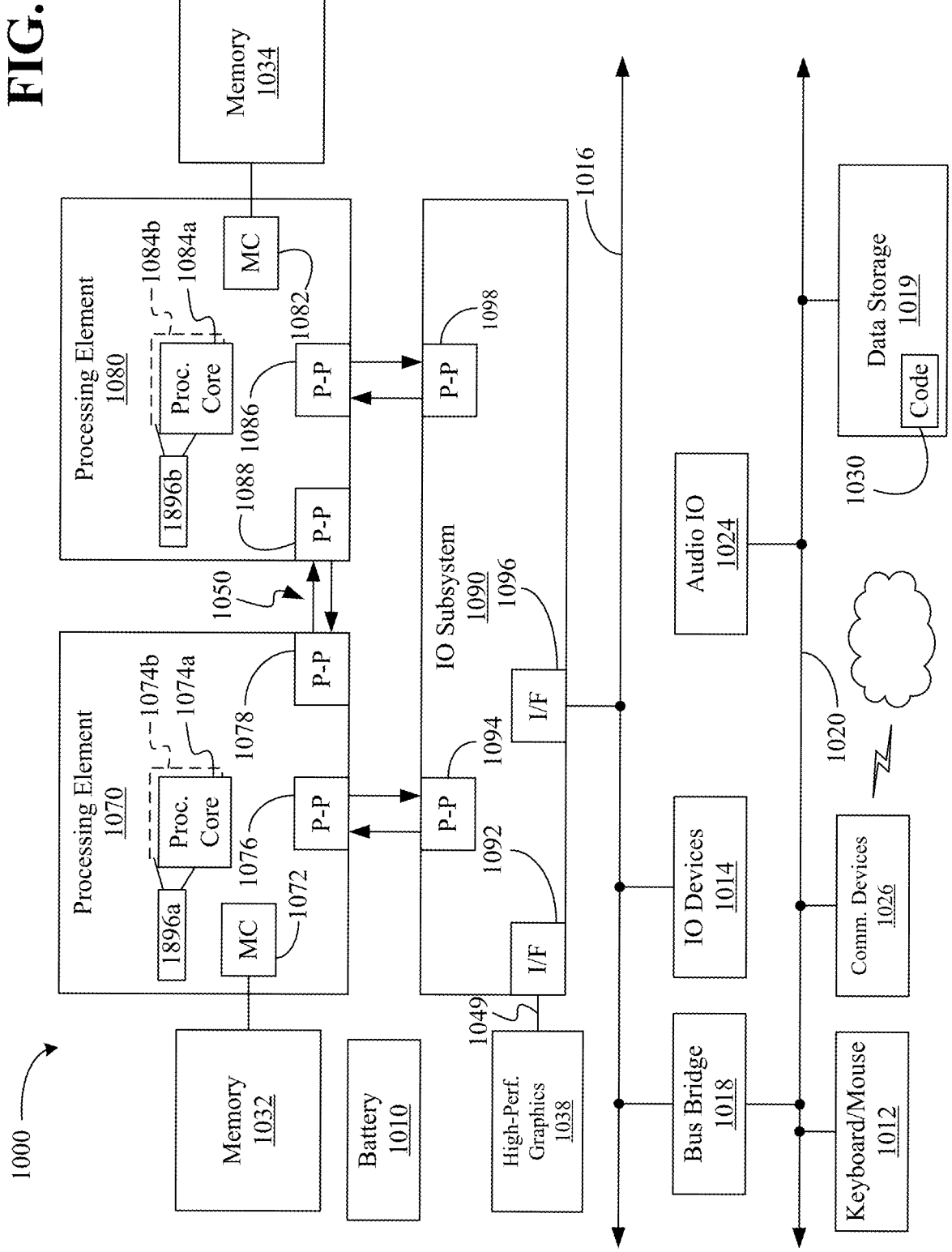

EFFICIENT AND SECURE SHARING OF LARGE DATA REPOSITORIES

CROSS REFERENCE TO RELATED APPLICATIONS

This application is a U.S. National Phase Patent Application which claims benefit to International Patent Application No. PCT/US2015/067535 filed on Dec. 22, 2015.

TECHNICAL FIELD

Embodiments generally relate to data sharing. More particularly, embodiments relate to efficient and secure sharing of large data repositories.

BACKGROUND

Large data repositories (e.g., big data, data lakes, etc.) may be used to store multi-tenant data that is accessed by a wide range and great number of individuals (e.g., users, accessors). For example, a particular organization might organize sales data, engineering data and human resources (HR) data into a large data repository that is accessible by tens of thousands of individuals or more. Enabling efficient and secure sharing of large data repositories may present significant challenges.

BRIEF DESCRIPTION OF THE DRAWINGS

The various advantages of the embodiments will become apparent to one skilled in the art by reading the following specification and appended claims, and by referencing the following drawings, in which:

FIG. 2 is a block diagram of an example of an executable view generation library according to an embodiment;

FIG. 3 is a block diagram of an example of a client system according to an embodiment;

FIG. 4 is an illustration of an example of a data access organization scenario according to an embodiment;

FIG. 9 is a block diagram of an example of a computing system according to an embodiment.

DESCRIPTION OF EMBODIMENTS

Figure 1:
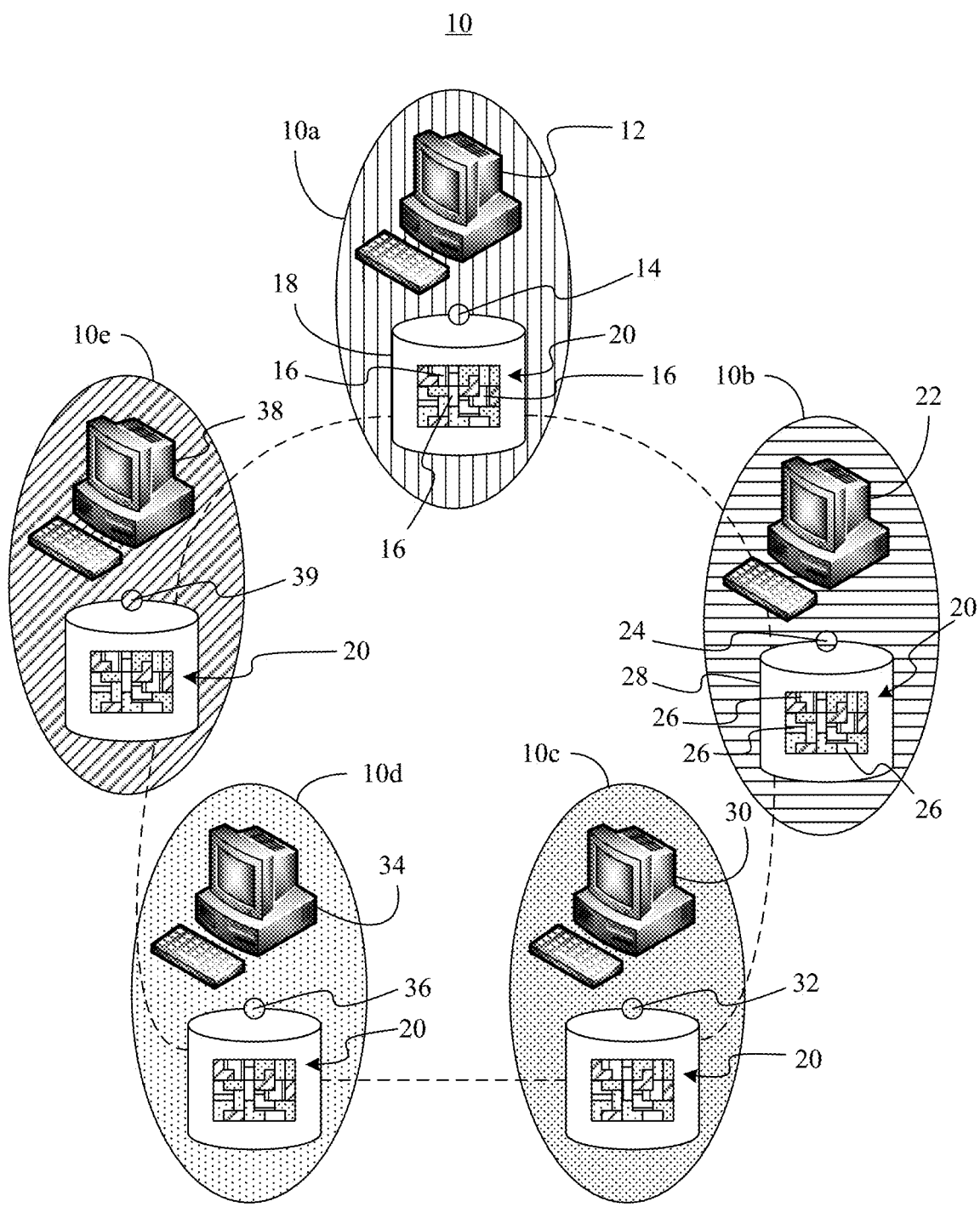
FIG. 1 is an illustration of an example of a distributed data sharing architecture according to an embodiment.

Turning now to FIG. 1, a distributed data sharing architecture 10 (10a-10e) is shown in which a plurality of client systems (e.g., tenants) engage in efficient and secure sharing of obfuscated multi-tenant data 20. A "tenant" may be any entity (e.g., client system, application, department, data consumer) that attempts to access data from a particular source (e.g., a single data lake). For example, if an application is hosted on a virtual machine, the virtual machine may be considered a tenant to the extent that it consumes data. The illustrated multi-tenant data 20, which is commingled in a tenant-independent data structure, may be considered "obfuscated" to the extent that it is masked/hidden with random characters or data. The process of obfuscating the multi-tenant data 20 may therefore involve data substitution, data shuffling, number and/or data variance techniques, encryption, etc., or any combination thereof. Moreover, the obfuscated multi-tenant data 20 may reside in a centralized and relatively large data repository (not shown) such as, for example, a data lake that holds the multi-tenant data 20 until it is needed by the client systems.

In the illustrated example, a first client system 12 in a first architectural domain 10a uses a first data lens 14 to view (e.g., read) and/or modify (e.g., write) portions 16 (e.g., selected objects) of the obfuscated multi-tenant data 20 to which a user of the first client system 12 has been granted access. The first data lens 14 may be implemented as an executable view generation library that runs in a client-side address space of the first client system 12. The executable view generation library may deobfuscate the portions 16 of the obfuscated multi-tenant data 20 prior to presentation on a display of the first client system 12 and re-obfuscate the portions 16 of the multi-tenant data 20 prior to storage. More particularly, the first data lens 14 may provide a conceptualized representation 18 (e.g., single-tenant view) of the actual data repository that contains the obfuscated multi-tenant data 20, wherein only the portions 16 of the data 20 are visible in the conceptualized representation 18.

Similarly, a second client system 22 in a second architectural domain 10b may use a second data lens 24 to view and/or modify portions 26 of the obfuscated multi-tenant data 20 to which a user of the second client system 22 has been granted access. The second data lens 24 may also be implemented as an executable view generation library that runs in a client-side address space of the second client system 22. Accordingly, the executable view generation library may deobfuscate the portions 26 of the obfuscated multi-tenant data 20 prior to presentation on a display of the second client system 22 and re-obfuscate the portions 26 of the multi-tenant data 20 prior to storage. More particularly, the second data lens 24 may provide a conceptualized representation 28 of the actual data repository that contains the obfuscated multi-tenant data 20, wherein only the portions 26 of the data 20 are visible in the conceptualized representation 28.

The architecture 10 may also include a third architectural domain 10c having a third client system 30 with a third data lens 32, a fourth architectural domain 10d having a fourth client system 34 with a fourth data lens 36, a fifth architectural domain 10e having a fifth client system 38 with a fifth data lens 39, and so forth. Thus, the illustrated architecture 10 enables access mediation to be physically spread out but kept opaque on each client system. As will be discussed in greater detail, a lightweight access binding service may be used to install the view generation libraries to each address space in an unforgeable and opaque fashion.

FIG. 2 shows a data lens 40 (e.g., executable view generation library) for a given accessor (e.g., principal, user). The illustrated data lens 40 is a data access module that is linked in a specific way to a principal using data access binding. The data lens 40 may use structure information 44 to determine how obfuscated data 42 is organized in one or more repositories (e.g., collections of shared data). Additionally, a privileges catalog 46 may enable the data lens 40 to determine what privileges are available to an accessor and a data view definition 48 may indicate the particular remapping of the data 42 that gives the accessor an appropriate data view 50 (e.g., logical single-tenanted view). Accordingly, the obfuscated data 42 may be meaningless except as accessed through the data lens 40. The data lens 40 may be built on demand (e.g., cached to amortize overheads) in order to be adaptable to hardware platform capabilities, data layouts, and privilege granularities.

Turning now to FIG. 3, a client system 52 is shown in which a display 54 visually presents deobfuscated multi-tenant data 56 to, for example, a user/principal. The client system 52 may include, for example, a desktop computer, workstation, notebook computer, tablet computer, convertible notebook, smart phone, wearable computer, personal digital assistant (PDA), mobile Internet device (MID), media player, etc., or any combination thereof. A bus 58 may be coupled to the display 54, wherein a hardware platform 60 may be coupled to the bus 58. In the illustrated example, the hardware platform 60 includes a system on chip (SoC) 68 (e.g., host processor, input/output module, chipset) and a memory apparatus 62 having a client-side address space 64 that is dedicated to an accessor (e.g., principal, user) of obfuscated multi-tenant data 66.

An executable view generation library 70 (e.g., data lens) may be stored to the client-side address space 64. In one example, the executable view generation library 70 is stored to a trusted region 72 of the client-side address space 64. The trusted region 72 may be established and maintained via a suitable security solution such as, for example, INTEL® SGX (Software Guard Extensions), INTEL® MPX (Memory Protection Extensions), etc., or any combination thereof. As will be discussed in greater detail, the hardware platform 60 may include a secure interface 74 (e.g., trusted execution environment) to receive the executable view generation library 70 from a data access binder (not shown), wherein the executable view generation library 70 may conduct a self-extraction, conduct a self-installation to the trusted region 72, measure an opaqueness of itself and send the opaqueness measurement to the data access binder. Such an approach may enable the trusted region 72 to be impenetrable by privileged system code such as operating system (OS) code, virtual machine monitor (VMM) code, basic input/output system (BIOS) code, system management mode (SMM) code, and so forth.

If the executable view generation library 70 receives a request to access at least a portion of the obfuscated multi-tenant data 66, the library 70 may convert the obfuscated multi-tenant data 66 to the deobfuscated multi-tenant data 56 based on metadata associated with the executable view generation library 70. The library 70 may also generate a single-tenant view based on the deobfuscated multi-tenant data 56. The metadata my include labels, access privileges, security parameters, schemas, relationships among accessors of the obfuscated multi-tenant data, etc., or any combination thereof. Protection of the deobfuscated multi-tenant data 56 in other system components such as, for example, the display 54, the bus 58 and/or the SoC 68 may be achieved via a suitable security solution such as, for example, INTEL® TXT (Trusted Execution Technology), and so forth.

The efficiency and security benefits of the illustrated solution may target more than just structured data in relational tables or big data systems. Indeed, the advantages of the illustrated solution may be equally applicable whether data is at rest or in flow, whether it is transient, original, or derived data; and whether the infrastructure is physical or virtual. In this way, the illustrated solution may have a broader scope than is typically the case with information security protocols specific to a database manager, a file system, an information archival system, etc. In such systems, it may be common to have centralized console(s) managing trust diameters and even securing specific network perimeters. By making this aspect elastic, the illustrated solution makes information guardianship more adaptive and broad based, and thus more robust at the same time.

For example, the illustrated solution promotes scalable distribution of data, so that fabric innovations and high speed storage innovations may be advantageous. This scalability may be due to elimination of an access control hub that is a central computation and communication bottleneck. Rather, the illustrated solution results in distributed, scalable, in-process, user-level portrayers of information.

Data access overhead through the executable view generation library 70 may be relatively small and proportional to the amount of data accessed. Memory capacity and bandwidth overheads may be similarly proportional. Thus, in addition to flexible sharing, the illustrated solution may achieve pay-by-use and cache-as-needed characteristics.

Access Organization

A set of metadata may facilitate access management over data. At a high level, the metadata may be used to interpret a principal's access so that the principal remains oblivious as to how and where data is stored. The metadata may also be used to perform operations such as, for example, the appropriate create/receive/update/delete (CRUD) operations independently on a per principal basis.

In a nutshell, the metadata might contain:

Labels, which can overlap, and serve to name ranges of data in a shared repository;

Principal access privileges, which are defined in terms of the labels;

Security parameters that describe the stringency with which various information is protected;

Schemas, which reflect the structure of information;

Relationships among principals (e.g., hierarchies), and so forth.

Simply put, the metadata may be used to define and enforce information exposure.

FIG. 4 shows a data access organization scenario in which multiple accessors (e.g., "Bob", "Kay", "Ted") of obfuscated multi-tenant data 80 are provided with different views 76 (76a-76c) of the data by virtue of different data lenses 78 (78a-78c). The data lenses 78 may generally enable various access computations to be packaged differently. For example, an application or a principal might choose to layer their own additional data transformations as part of a system of data lenses that is built around the illustrated scenario.

More particularly, at the physical level, data 80 from many different tenants may be commingled for storage. Thus, for a given record structure, data from Bob, Kay, and Ted may reside in adjacent records. The illustrated data 80 is not generally "in the clear", and sensitive parts of it may be obfuscated, encrypted, encoded, and even "offlined" or indirected, to prevent disclosure to unauthorized users/individuals having access to the physical media on the client system/machine.

Each item (e.g., record, tuple, object) in the data 80 may have some bitmap or tag or index entry, which may be referred to as element metadata 82. The element metadata 82 may be, for example, a compact, or dictionary encoded qualifier. Moreover, an item in the data 80 may include multiple attributes or fields, which may be referred to as attribute metadata 84. The element metadata 82 and the attribute metadata 84 may attach fine grained demarcations over the data 80 with regard to how values are read or written. In a database for example, the element metadata 82 might be a hidden per-row tag or a bitmap that records the value zero for each missing column or a per-row version number. The attribute metadata 84 might be a per column bitmap or a code that indicates which dictionary should be used for decompressing values in the column, etc. Other storage structures may similarly use the metadata 82, 84 to annotate how to interpret the physical bytes stored.

The metadata may also include rights information 86 (e.g., rights, credentials, privileges). The rights information 86, which may be maintained and distributed by a pool-wide metadata service, may establish which principal has what level of access to shared information. The rights information 86 may specify direct rights as well as derived rights that are relationship dependent. In one example, the metadata includes one or more data labels 88 (e.g., categories) attached to groups/subsets of the data 80 or metadata. The data labels 88 may provide economy of representation in mapping the rights information 86 to other information.

Additionally, the metadata may include physical schema 90 (e.g., physical layout and protection schema) describing the contents of various parts of the storage hierarchy (e.g., filenames), how it is structured, and any credentials that are necessary to access the schema stores. Moreover, logical schema 92 may provide definitions of the logical views of information surfaced to the principals. Thus, for example, two principals, Bob and Kay may enjoy access to the same data label, but Bob's view may include a column (i.e., an attribute) that Kay does not see, or vice-versa.

Each data lens 78 may therefore be a data structure and access credentials rules compiler that translates from the metadata to navigation and encoding/decoding transformations that produce an appropriate single-tenant logical view 76, starting from the obfuscated data 80 (e.g., polyglot, encrypted/obfuscated raw data). These procedures may be compiled remotely by a distributed secure service and cryptographically sent along deployment paths 94 to each client system as the data lenses 78 (e.g., executable view generation libraries, "thunks") to be installed by a trusted loader into each address space such that the data lenses 78 remain inscrutinizable and unalterable. Hardware security protection (e.g., INTEL® TXT) at individual nodes, if it exists, may secure components such as the operating system. Even without this protection, however, other security protections (e.g., INTEL® SGX) at individual nodes may both perform secure installation and further host the execution of the data lenses 78 that are received.

Accordingly, even though the data 80 may be compressed, commingled, encoded or obfuscated, and replicated across physical disks/memory of end nodes (where principals access it), the principals themselves may only see a virtualized view 76 in which they are looking at data that is organized for their logical access. Thus, in the illustrated example, a first lens 78a tailors a first view 76a to Bob's access rights, a second lens 78b tailors a second view 76b to Kay's access rights, a third lens 78c tailors a third view 76c to and Ted's access rights, while the respective data exists as if in private containers to be read or written transparently, efficiently and quickly. Thus, the illustrated solution demonstrates how the deconstruction and reconstruction of data from a shared repository may occur at a fine-grain resolution.

Figure 5:
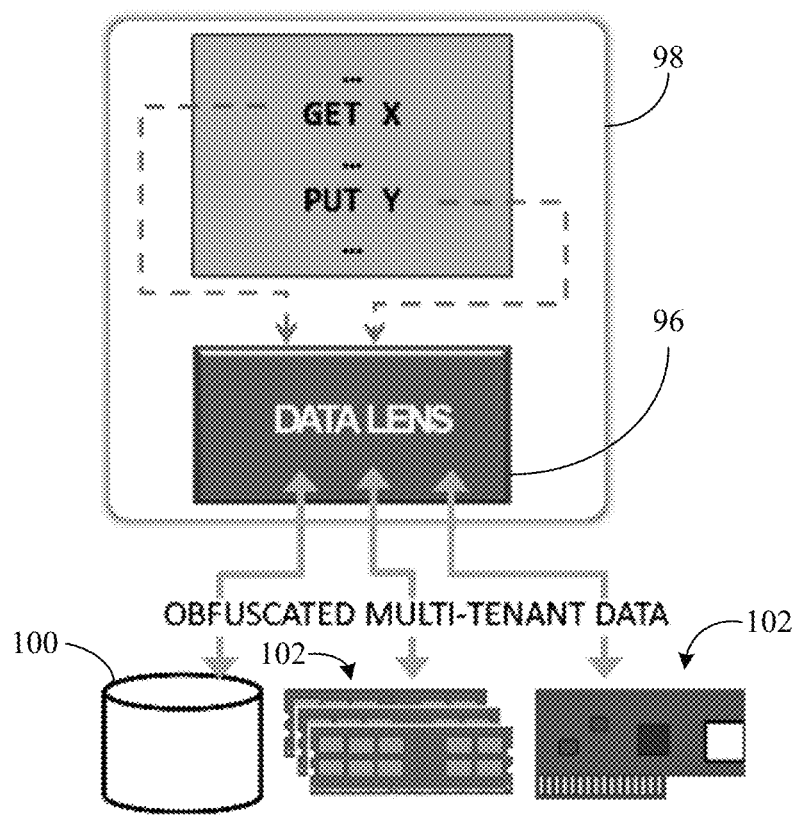
FIG. 5 is an illustration of an example of an address space usage scenario according to an embodiment.

FIG. 5 shows an address space usage scenario in which a data lens 96 (e.g., executable view generation library) functions as a set of procedures that collectively fit into an address space 98 dedicated to the accessor as a module that never calls out of itself. For example, read operations (e.g., "Get X") and write operations (e.g., "Put Y") may be managed by the data lens 96 entirely within the address space 98. The data lens 96 may be manufactured once, and securely cached for reuse, with its construction being controlled by neither the principal (i.e., the accessor/application) nor the operating system running on the node where the accesses occur. Data in physical form may remain obfuscated and compact in a repository 100. The illustrated data lens 96 also obfuscates and presents the data to client system components 102 of the accessor to meet the joint objective of a logically simplified view and secure multi-tenancy, without requiring coordination with a central entity.

Security solutions (e.g., INTEL® SGX) may be used in conjunction with a cluster/cloud wide secure data access binding service in order to manufacture and install the data lens 96 securely. For example, the security solution might position the operating system (OS) outside a sandbox, and position hardware and a portion of the user application inside the sandbox. Thus, a distributed sandbox may be created by tying the individual sandboxes on different machines (and address spaces) together with a secure channel that exchanges the sandbox bytes.

Accordingly, the obfuscated multi-tenant data may reside in one pool that is deduplicated, replicated, backed-up, compressed and/or decompressed as needed for data management. Access management may be separated out and distributed into each principal's address space, where the function of only selecting what is given to the principal is performed in an opaque and secure manner. Moreover, data may always remain obscured and protected, only being materialized into clear form at the closest location to the accessor (i.e., within the accessor's address space). Such an approach may also facilitate in the distribution of data since the storage location of data may not be dictated by the location of the client system accessing it. Remote, long-duration caching may also become much easier.

Figure 6:
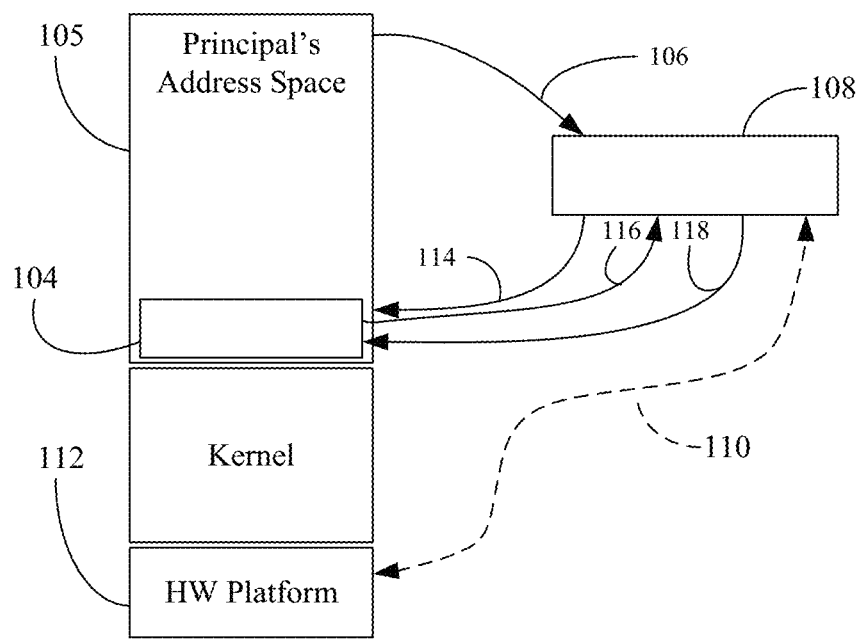
FIG. 6 is an illustration of an example of a data access binding according to an embodiment.

FIG. 6 shows a high level summary of a data access binding. Data access binding may generally firewall the execution of a data lens 104 (e.g., executable view generation library) within an address space 105 that is dedicated to an accessor/principal so that the data lens 104 may not be reverse engineered. The address space 105 may reside in or contain a trusted region (e.g., protected by INTEL® SGX) or OS kernel if such a security solution is not available. More particularly, the data lens 104 may be designed to be robust against an untrusted kernel and an untrusted user, alike. The illustrated database access binding may also be a lightweight solution that is designed to be the interface between a principal and a shared data repository (i.e., an explicitly installed intermediary rather than a dynamically interposed intermediary).

The process of installing the data lens 104 may start with a request along path 106 from the address space 105 dedicated to the principal to a data access binder 108. The data access binder 108 may be a cluster-wide distributed but tamper-proof service/layer running on the client system that compiles and distributes the data lens 104 payload when requested. The data access binder 108 may authenticate the request with an underlying hardware (HW) platform 112 along path 110. The hardware platform 112 may have security (e.g., INTEL® SGX and/or INTEL® TXT) capabilities to validate that the request is from a known principal and known hardware with an unmolested operating system.

The data access binder 108 may send a self-extracting and self-installing payload to the address space 105 along path 114, wherein the payload extracts and installs itself as the data lens 104 in a trusted region of the address space 105

(e.g., an opaque container obtained from the security solution). The data lens 104 may then self-measure the installation (e.g., determine file sizes), verify its opaqueness, and send the measurement back to the data access binder 108 along path 116 through a secure channel. Along path 118, the data access binder 108 may effectively activate the data lens 104 by sending back a set of bits that write into specific offsets into the data lens 104. Accordingly, the user application may begin to access the shared data via the opaque tunnel that is created by the data lens 104.

Of particular note is that the data lens 104 may not be constructed by the OS at the client system/machine. Rather, the entity that constructs the data lens 104 for a particular accessor may be a data center, cloud or cluster-wide service that writes and/or compiles it. Moreover, the data lens 104 may have compiled into it, the same mechanisms that compilers and loaders use in the translation of symbolic data references to actual run-time addresses to data. Except that, here the translation may include read/write calls into a local file system and/or send/receive calls to remote machines that may contain the necessary physical segments of information.

Additionally, the data lens 104 may have the ability to re-transform the shared raw data so that the lens 104 may adapt continuously. In one example, having reduced the volume of messaging required with a shared server such as that in a traditional access control setup, the illustrated approach may free up head room for infrequent, background, random, challenge-response reauthentication and verification of the integrity of data lens 104 as a channel of secure obfuscation/deobfuscation. Moreover, the data lens 104 may translate handles or "pointers" into data in addition to translating the data itself.

A secure loader protected by a security solution may decode the byte sequence into the executable data lens 104 (e.g., an executable library). This library code payload may be installed in a set of pinned pages, and these pages may be mapped as execute-only pages in the principal's address space 105 in order to achieve protection from intrusion by the operating system (e.g., making the page tables non-modifiable).

In another example, all data in shared repositories may exist as obfuscated data that is meaningless to anyone except to the principal who accesses the data through the specially crafted, personalized data lens 104. The data access binder 108 may correspond only with secure components (e.g., the INTEL® SGX enclaves) in order to remain protected from leaks of information via compromised operating systems (e.g., at other cluster nodes).

As already noted, other security solutions such as, for example, INTEL® TXT may be used together with INTEL® SGX to defeat OS-related attack vectors, without losing the scalable, distributable and light-weight guardianship described herein. For example, an INTEL® TXT extension might be used to anchor a secure and trusted device driver in the host OS at the time of the OS installation, wherein the trusted device driver establishes a chain of trust between the hardware platform 112 and the data access binder.

Figures 7A, 7B:
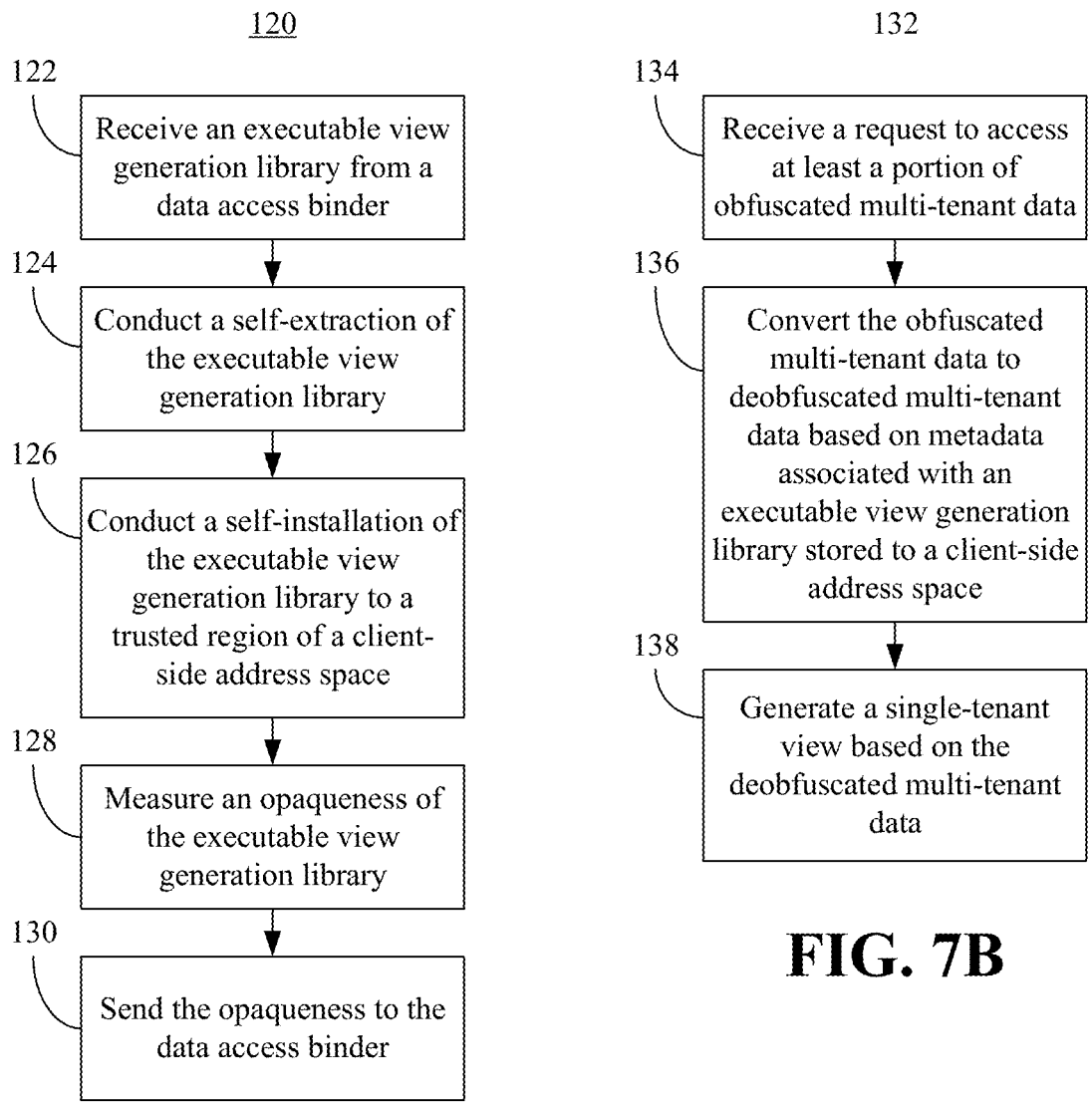
FIG. 7A is a flowchart of an example of a method of conducting a data access binding according to an embodiment.
FIG. 7B is a flowchart of an example of a method of operating an executable view generation library according to an embodiment.

FIG. 7A shows a method 120 of conducting a data access binding. The method 120 may generally be implemented in a client system such as, for example, the client system 52 (FIG. 3), already discussed. More particularly, the method 120 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 120 may be written in any combination of one or more programming languages, including an object oriented programming language such as JAVA, SMALLTALK, C++ or the like and conventional procedural programming languages, such as the "C" programming language or similar programming languages.

Illustrated processing block 122 provides for receiving an executable view generation library (e.g., data lens) from a data access binder such as, for example, the data access binder 108 (FIG. 6). A self-extraction of the executable view generation library may be conducted at block 124, wherein illustrated block 126 conducts a self-installation of the executable view generation library to a trusted region of a client-side address space. As already noted, block 126 may install the executable view generation library in a set of pinned pages that are mapped as execute-only pages in the principal's address space in order to achieve protection from intrusion by the operating system (e.g., making the page tables non-modifiable). Additionally, an opaqueness of the executable view generation library may be measured at block 128. Block 128 may generally involve quantifying the level transparency of the underlying data structure associated with the executable view generation library. Thus, the opaqueness might be measured by attempting calls to various subroutines in the library in order to determine whether the appropriate handles, variables, record sizes, fields, etc., to complete the calls are visible/accessible outside the library. The opaqueness measurement may be sent to the data access binder at block 130.

FIG. 7B shows a method 132 of operating an executable view generation library. The method 132 may generally be implemented in an executable view generation library such as, for example, the data lenses 14, 24, 32, 36, 39 (FIG. 1), the data lens 40 (FIG. 2), the executable view generation library 70 (FIG. 3), the data lenses 78 (FIG. 4), the lens 96 (FIG. 5) and/or the lens 104 (FIG. 6), already discussed. More particularly, the method 120 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 134 provides for receiving a request to access (e.g., view and/or modify) at least a portion of obfuscated multi-tenant data. The request may be received from, for example, a user application running on a client system. Illustrated block 136 converts the obfuscated multi-tenant data to deobfuscated multi-tenant data based on metadata associated with an executable view generation library (e.g., a data lens) stored to a client-side address space. As already noted, the executable view generation library may be stored to a trusted region of the client-side address space. Moreover, the metadata may include labels, access privileges, security parameters, schemas (e.g., physical and/or logical), relationships among accessors of the obfuscated multi-tenant data, etc., or any combination thereof. Block 138 may generate a single-tenant view based on the deobfuscated multi-tenant data.

Figure 8:
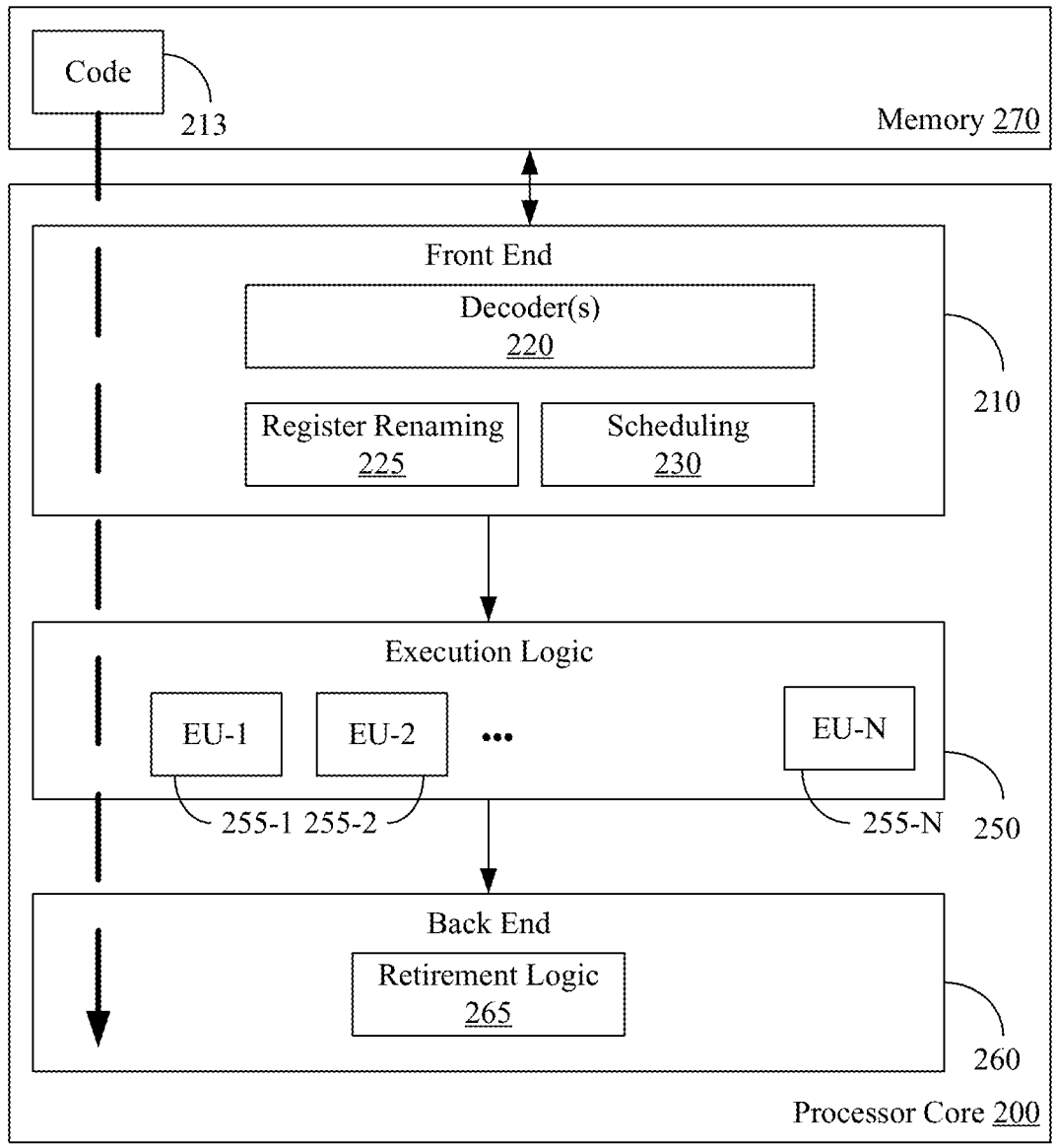
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 120 (FIG. 7A) and/or the method 132 (FIG. 7B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 120 (FIG. 7A) and/or the method 132 (FIG. 7B), already discussed, and may be similar to the code 213 (FIG. 8), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a client system comprising a display to visually present deobfuscated multi-tenant data, a bus coupled to the display and a hardware platform coupled to the bus, the hardware platform comprising a memory apparatus including a client-side address space dedicated to an accessor of obfuscated multi-tenant data, wherein an executable view generation library is stored to the client-side address space.

Example 2 may include the system of Example 1, wherein the executable view generation library is to receive a request to access at least a portion of the obfuscated multi-tenant data, convert the obfuscated multi-tenant data to the deobfuscated multi-tenant data based on metadata associated with the executable view generation library and generate a single-tenant view based on the deobfuscated multi-tenant data.

Example 3 may include the system of Example 2, wherein the metadata includes one or more labels, access privileges, security parameters, schemas or relationships among accessors of the obfuscated multi-tenant data.

Example 4 may include the system of Example 1, further including a secure interface to receive the executable view generation library from a data access binder.

Example 5 may include the system of Example 4, wherein the executable view generation library is to conduct a self-extraction, conduct a self-installation, measure an opaqueness of itself and send the opaqueness to the data access binder.

Example 6 may include the system of any one of Examples 1 to 5, wherein the executable view generation library is stored to a trusted region of the client-side address space.

Example 7 may include a memory apparatus comprising a client-side address space dedicated to an accessor of obfuscated multi-tenant data, wherein an executable view generation library is stored to the client-side address space.

Example 8 may include the memory apparatus of Example 7, wherein the executable view generation library is to receive a request to access at least a portion of the obfuscated multi-tenant data, convert the obfuscated multi-tenant data to deobfuscated multi-tenant data based on metadata associated with the executable view generation library and generate a single-tenant view based on the deobfuscated multi-tenant data.

Example 9 may include the memory apparatus of Example 8, wherein the metadata includes one or more labels, access privileges, security parameters, schemas or relationships among accessors of the obfuscated multi-tenant data.

Example 10 may include the memory apparatus of Example 7, further including a secure interface to receive the executable view generation library from a data access binder.

Example 11 may include the memory apparatus of Example 10, wherein the executable view generation library is to conduct a self-extraction, conduct a self-installation, measure an opaqueness of itself and send the opaqueness to the data to access binder.

Example 12 may include the memory apparatus of any one of Examples 7 to 11, wherein the executable view generation library is stored to a trusted region of the client-side address space.

Example 13 may include a method of operating a client system, comprising receiving a request to access at least a portion of obfuscated multi-tenant data, converting the obfuscated multi-tenant data to deobfuscated multi-tenant data based on metadata associated with an executable view generation library stored to a client-side address space and generating a single-tenant view based on the deobfuscated multi-tenant data.

Example 14 may include the method of Example 13, wherein the metadata includes one or more labels, access privileges, security parameters, schemas or relationships among accessors of the obfuscated multi-tenant data.

Example 15 may include the method of Example 13, further including receiving the executable view generation library from a data access binder.

Example 16 may include the method of Example 15, further including conducting a self-extraction, conducting a self-installation, measuring an opaqueness of the executable view generation library, and send the opaqueness to the data access binder.

Example 17 may include the method of any one of Examples 13 to 16, wherein the executable view generation library is stored to a trusted region of the client-side address space.

Example 18 may include at least one computer readable storage medium comprising a set of instructions, which when executed by a computing system, cause the computing system to receive a request to access at least a portion of obfuscated multi-tenant data, convert the obfuscated multi-tenant data to deobfuscated multi-tenant data based on metadata associated with an executable view generation library stored to a client-side address space and generate a single-tenant view based on the deobfuscated multi-tenant data.

Example 19 may include the at least one computer readable storage medium of Example 18, wherein the metadata is to include one or more labels, access privileges, security parameters, schemas or relationships among accessors of the obfuscated multi-tenant data.

Example 20 may include the at least one computer readable storage medium of Example 18, wherein the instructions, when executed, cause the computing system to receive the executable view generation library from a data access binder.

Example 21 may include the at least one computer readable storage medium of Example 20, wherein the instructions, when executed, cause the computing system to conduct a self-extraction, conduct a self-installation, measure an opaqueness of the executable view generation library, and send the opaqueness to the data access binder.

Example 22 may include the at least one computer readable storage medium of any one of Examples 18 to 21, wherein the executable view generation library is to be stored to a trusted region of the client-side address space.

Example 23 may include a client system comprising means for receiving a request to access at least a portion of obfuscated multi-tenant data, means for converting the obfuscated multi-tenant data to deobfuscated multi-tenant data based on metadata associated with an executable view generation library stored to a client-side address space and means for generating a single-tenant view based on the deobfuscated multi-tenant data.

Example 24 may include the system of Example 23, wherein the metadata is to include one or more labels, access privileges, security parameters, schemas or relationships among accessors of the obfuscated multi-tenant data.

Example 25 may include the system of Example 23, further including means for receiving the executable view generation library from a data access binder.

Example 26 may include the system of Example 25, further including means for conducting a self-extraction, means for conducting a self-installation, means for measuring an opaqueness of the executable view generation library, and means for send the opaqueness to the data access binder.

Example 27 may include the system of any one of Examples 23 to 26, wherein the executable view generation library is to be stored to a trusted region of the client-side address space.

Thus, techniques described herein may provide for a data access binder (DAB) that componentizes access/policy management and distributes it back into each caller's address space, to be performed there securely and opaquely—while non-access-control functions such as deduplication, replication, backup, compression, migration, etc., may be decoupled from management of access. Additionally, data at rest or in transit may remain obscured, as it is "unveiled" only selectively at the point of use. Storage management systems may therefore only deal with "BOBs" (bunches of bytes)—liberating infrastructure providers from protecting large shared repositories or monitoring and auditing who accesses what through which channel of access.

Techniques may also facilitate immediate applicability of enhanced machine capabilities. For example, in addition to the applicability of security solutions such as INTEL® SGX in implementing the DAB and data lens, data lens procedures may use new instructions on machines that have them, and use slower procedures on machines that do not have them. Indeed, a substantial portion of the data may call for no permission control, but might still call for integrity protection. The integrity protection may be provided by a faster, secure hash algorithm (SHA) family of instructions. Moreover, memory protection extensions (INTEL® MPX) may be used to prevent buffer overflows and digital random number generator (DRNG) technology may be used to introduce mutations into obfuscation/deobfuscation algorithms in order to defeat robust reverse engineering processes.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a display to visually present deobfuscated multi-tenant data;
a bus coupled to the display; and
a client-side hardware platform in a client device coupled to the bus, the hardware platform comprising a memory apparatus including a client-side address space dedicated to an accessor of obfuscated multi-tenant data, wherein an executable view generation library is stored to the client-side address space, and
wherein the executable view generation library is to receive a request to access at least a portion of the obfuscated multi-tenant data, convert the at least a portion of the obfuscated multi-tenant data to the deobfuscated multi-tenant data based on metadata associated with the executable view generation library, and generate a single-tenant view based on the deobfuscated multi-tenant data,
wherein the obfuscated multi-tenant data includes commingled data from a plurality of tenants,
wherein the deobfuscated multi-tenant data is machine readable by the hardware platform,
wherein the metadata includes one or more labels, access privileges, security parameters, schemas or relationships among accessors of the obfuscated multi-tenant data, and
wherein the executable view generation library is stored to a trusted region of the client-side address space.

2. The system of claim 1, further including a secure interface to receive the executable view generation library from a data access binder.

3. The system of claim 2, wherein the executable view generation library is to conduct a self-extraction, conduct a self-installation, measure an opaqueness of itself and send the opaqueness to the data access binder.

4. An apparatus comprising:
a semiconductor integrated circuit comprising memory, the memory comprising a client-side address space dedicated to an accessor of obfuscated multi-tenant data, wherein an executable view generation library is stored to the client-side address space, and
wherein the executable view generation library is to receive a request to access at least a portion of the obfuscated multi-tenant data, convert the at least a portion of the obfuscated multi-tenant data to deobfuscated multi-tenant data based on metadata associated with the executable view generation library, and generate a single-tenant view based on the deobfuscated multi-tenant data,
wherein the obfuscated multi-tenant data includes commingled data from a plurality of tenants,
wherein the deobfuscated multi-tenant data is machine readable by a client-side hardware platform in a client device providing the client-side address space,
wherein the metadata includes one or more labels, access privileges, security parameters, schemas or relationships among accessors of the obfuscated multi-tenant data, and
wherein the executable view generation library is stored to a trusted region of the client-side address space.

5. The apparatus of claim 4, further including a secure interface to receive the executable view generation library from a data access binder.

6. The apparatus of claim 5, wherein the executable view generation library is to conduct a self-extraction, conduct a self-installation, measure an opaqueness of itself and send the opaqueness to the data access binder.

7. A method comprising:
receiving a request to access at least a portion of obfuscated multi-tenant data;
converting, via an executable view generation library, the at least a portion of the obfuscated multi-tenant data to deobfuscated multi-tenant data based on metadata associated with the executable view generation library, wherein the executable view generation library is stored to a client-side address space dedicated to an accessor of the obfuscated multi-tenant data; and
generating, via the executable view generation library, a single-tenant view based on the deobfuscated multi-tenant data;
wherein the obfuscated multi-tenant data includes commingled data from a plurality of tenants,
wherein the deobfuscated multi-tenant data is machine readable by a client-side hardware platform in a client device providing the client-side address space,
wherein the metadata includes one or more labels, access privileges, security parameters, schemas or relationships among accessors of the obfuscated multi-tenant data, and
wherein the executable view generation library is stored to a trusted region of the client-side address space.

8. The method of claim 7, further including receiving the executable view generation library from a data access binder.

9. The method of claim 8, further including:
conducting a self-extraction;
conducting a self-installation;
measuring an opaqueness of the executable view generation library; and
sending the opaqueness to the data access binder.

10. At least one computer readable storage medium comprising a set of instructions, which when executed by a computing system, cause the computing system to:
receive a request to access at least a portion of obfuscated multi-tenant data;
convert, via an executable view generation library, the at least a portion of the obfuscated multi-tenant data to deobfuscated multi-tenant data based on metadata associated with the executable view generation library, wherein the executable view generation library is stored to a client-side address space dedicated to an accessor of obfuscated multi-tenant data; and
generate, via the executable view generation library, a single-tenant view based on the deobfuscated multi-tenant data;
wherein the obfuscated multi-tenant data includes commingled data from a plurality of tenants,
wherein the deobfuscated multi-tenant data is machine readable by a client-side hardware platform in a client device providing the client-side address space,
wherein the metadata is to include one or more labels, access privileges, security parameters, schemas or relationships among accessors of the obfuscated multi-tenant data, and
wherein the executable view generation library is stored to a trusted region of the client-side address space.

11. The at least one computer readable storage medium of claim 10, wherein the instructions, when executed, cause the computing system to receive the executable view generation library from a data access binder.

12. The at least one computer readable storage medium of claim 11, wherein the instructions, when executed, cause the computing system to:
- conduct a self-extraction;
- conduct a self-installation;
- measure an opaqueness of the executable view generation library; and
- send the opaqueness to the data access binder.

* * * * *